Nov. 19, 1946.	J. W. MITCHELL ET AL	2,411,286
MERCHANDISE LOADER
Filed Dec. 26, 1944	4 Sheets-Sheet 1
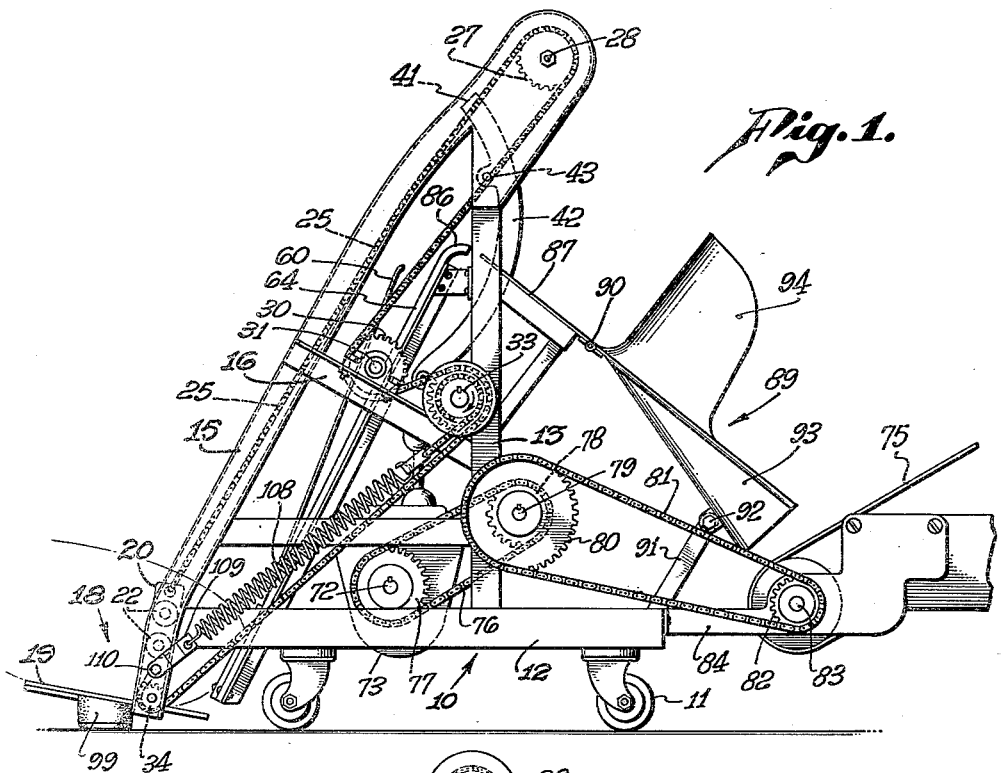
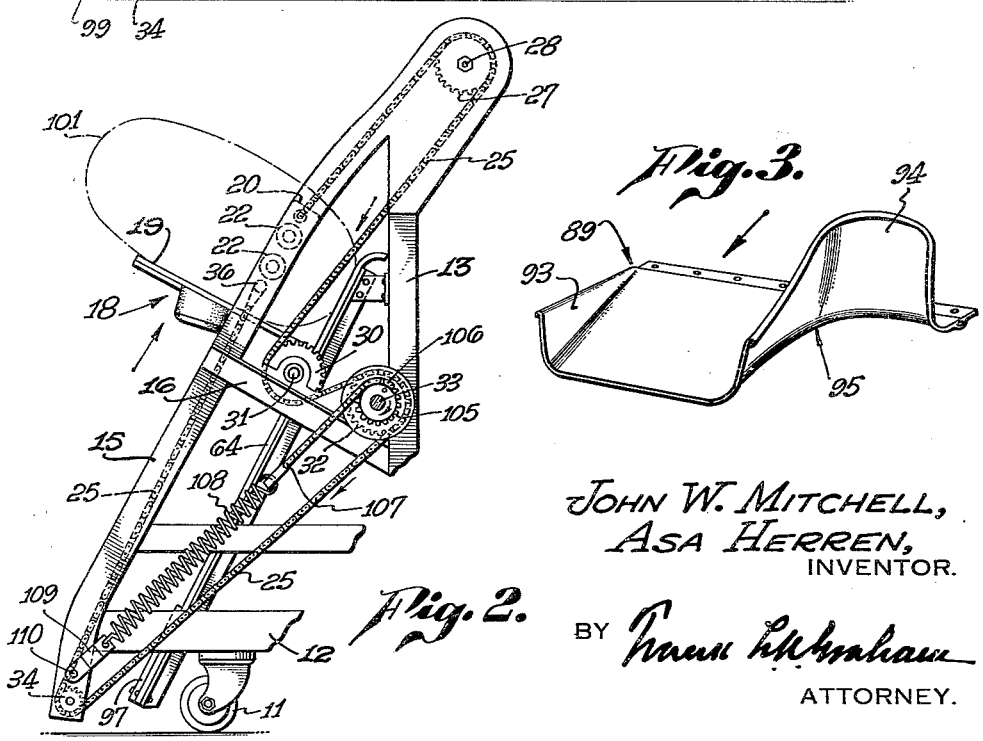
JOHN W. MITCHELL,
ASA HERREN,
INVENTOR.
BY 
ATTORNEY.

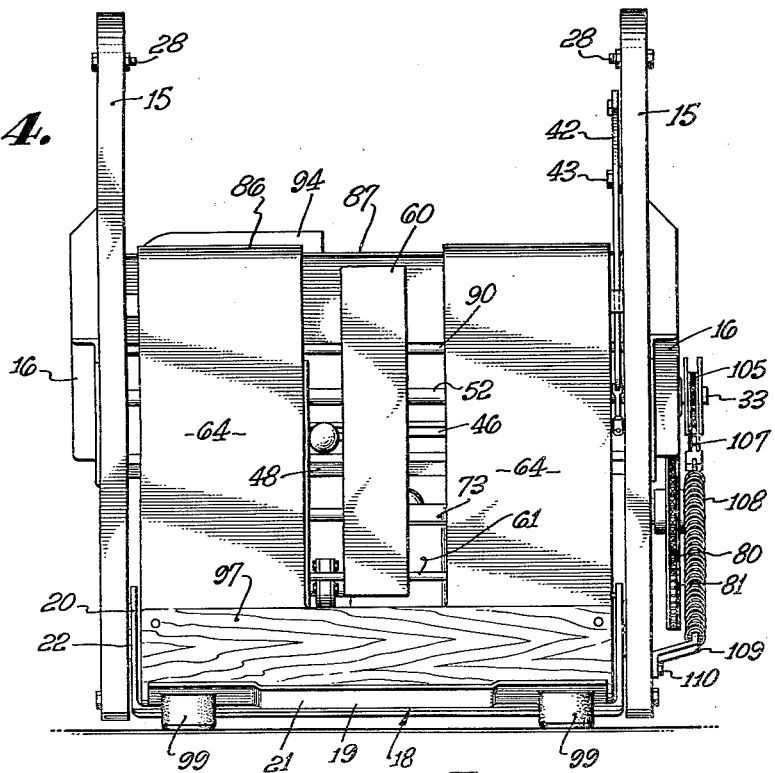
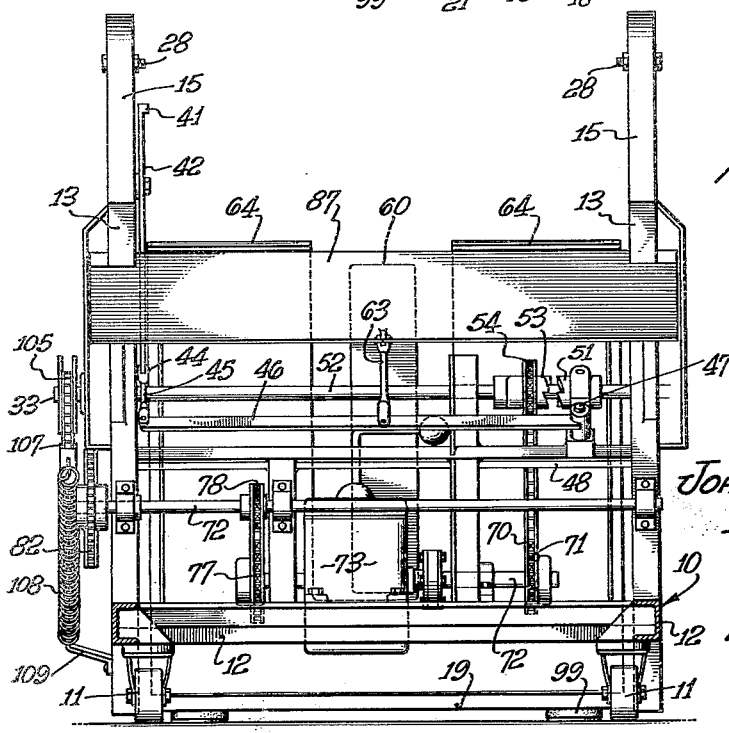

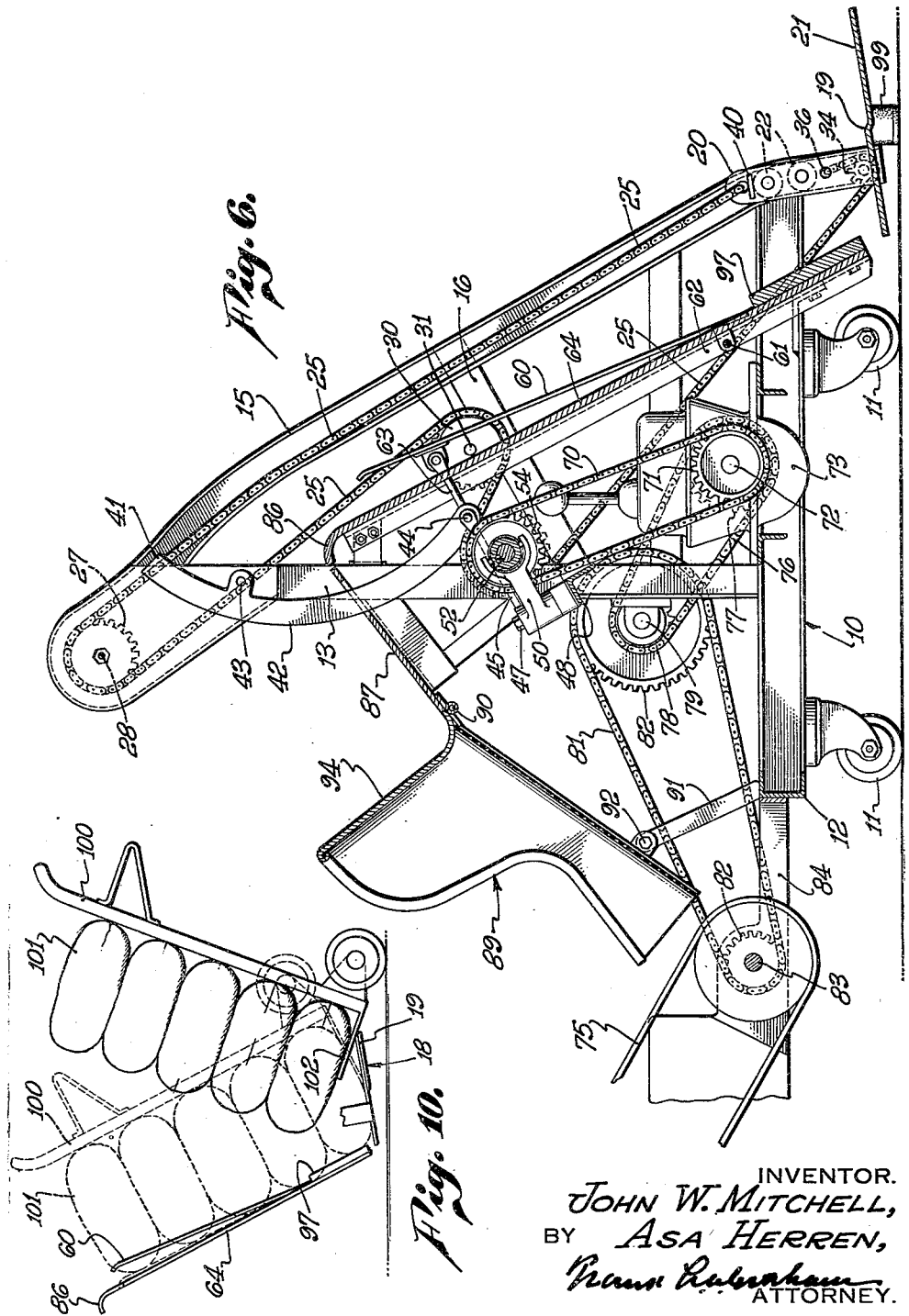

Nov. 19, 1946.  J. W. MITCHELL ET AL  2,411,286
MERCHANDISE LOADER
Filed Dec. 26, 1944    4 Sheets-Sheet 4
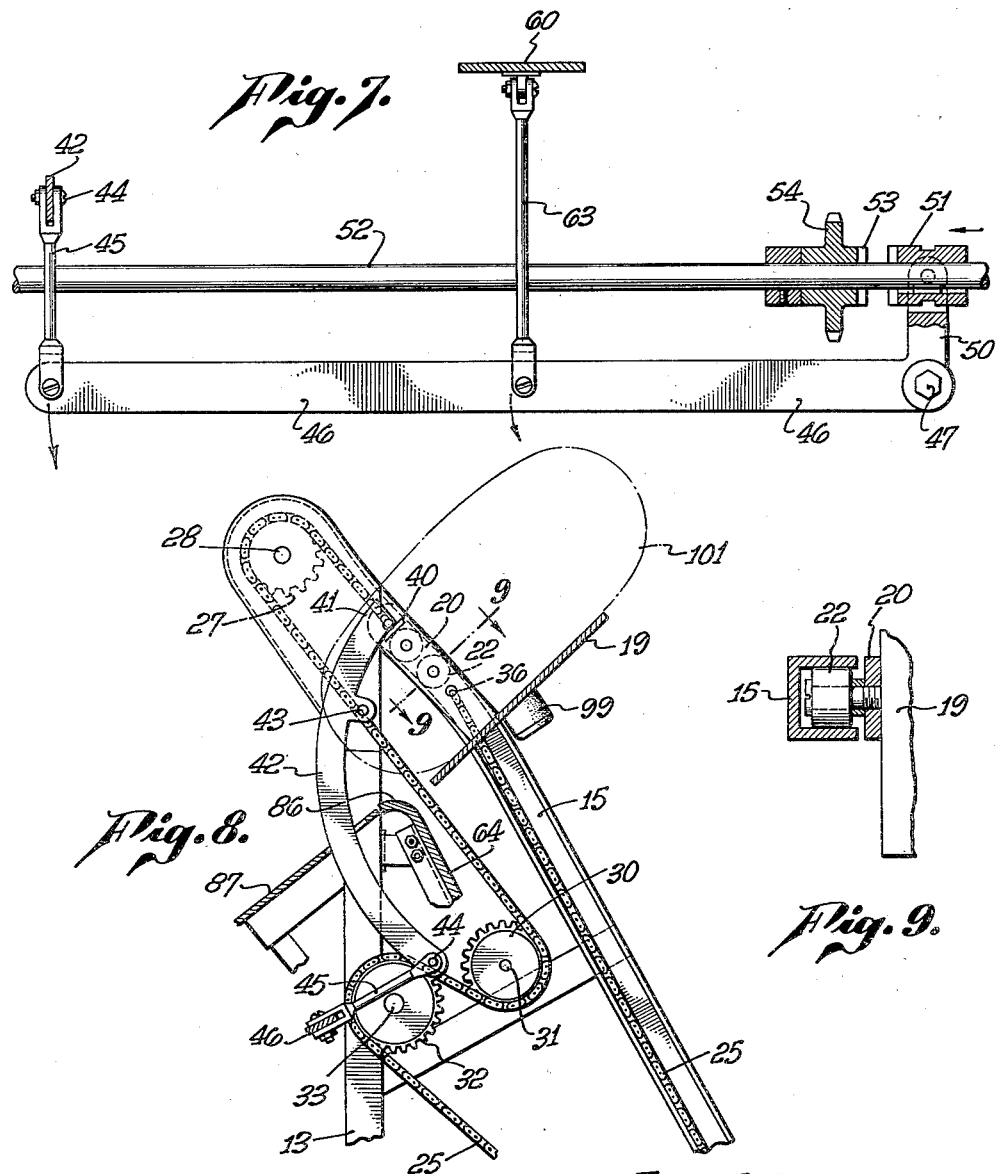
JOHN W. MITCHELL,
ASA HERREN,
INVENTOR.
BY ATTORNEY.

Patented Nov. 19, 1946

2,411,286

UNITED STATES PATENT OFFICE 2,411,286

MERCHANDISE LOADER

John W. Mitchell and Asa Herren, Irvine, Calif.

Application December 26, 1944, Serial No. 569,712

10 Claims. (Cl. 214—100)

This invention relates to machinery for handling merchandise, being more particularly a mechanical loader for loading a number of sacks or boxes in a single operation to a conveyor or stacker such as is commonly used in warehouses.

Ordinarily it is necessary that sacks of produce be lifted one at a time to a conveyor or other mechanism such as a piler. This practice is not only slow but requires a great amount of back-breaking labor.

It is an object of the present invention to provide a mechanical loader of simple form and operation which automatically elevates the sacks or boxes to the required height and discharges the same to mechanism for conveying the same to stacks where the sacks or boxes are temporarily stored.

Other objects and advantages will appear hereinafter from the following description and drawings.

Referring to the drawings, which are for illustrative purposes only:

Fig. 1 is a side elevational view showing a loader embodying the preferred form of our invention, the loader being shown with the lifting carriage in position to receive the load;

Fig. 2 is a view of the front portion of the loader shown in Fig. 1, showing the lifting carriage as it approaches the end of its upward travel;

Fig. 3 is a perspective view of a transfer chute for discharging the load from the loader to a conveyor;

Fig. 4 is an elevational face view of the loader shown in Fig. 1;

Fig. 5 is a rear elevational view, partly in section, of the loader shown in Fig. 1;

Fig. 6 is an enlarged side elevational view, partly in section, showing the opposite side of the loader to that shown in Fig. 1;

Fig. 7 is an enlarged fragmentary plan view, partly in section, of the clutch and connecting mechanism;

Fig. 8 is an enlarged elevational view, partly in section, of the upper portion of the loader in section, showing the lifting carriage as it engages the clutch controlling mechanism, looking in the opposite direction to Fig. 1;

Fig. 9 is an enlarged sectional view on line 9—9, Fig. 8, showing one of the guides and a portion of the lifting carriage; and Fig. 10 is a diagrammatic view showing the loading of the lifting platform.

Referring more particularly to the drawings, 10 generally indicates the frame of the loader which is supported on casters indicated at 11. The frame consists of a base structure 12 and vertical uprights 13. At the front of the loader are two tracks or guides 15 attached at their lower ends to the base 12 and at their upper ends to the uprights 13. The guides 15 consist of U-bars (in cross section) with the open ends of the U inwardly facing each other and extend upwardly and are inclined or angularly disposed rearwardly. The tracks or guides 15 are connected by braces 16 to the posts or uprights 13.

18 generally indicates a load lifting carriage which comprises a lifting platform 19 secured between two blocks or shoes 20. The front end of this platform 19 is depressed as indicated at 21 to receive the edge of a hand truck during the loading operation.

Mounted on the shoes 20 are rollers 22 which extend into and engage the guides 15 as shown in Fig. 9. Connected to the upper end of each of the blocks 20 is a sprocket chain indicated at 25 (see Fig. 6). This sprocket chain extends upwardly in the guides 15 and over sprocket wheels 27 mounted on shafts 28 supported in the upper end of the frame 10. From the sprocket wheels 27 these chains extend downwardly around sprocket wheels indicated at 30 on shafts 31 which are mounted upon the braces 16. From the sprocket wheels 30 the chain extends over sprocket wheels indicated at 32 on shafts 33 mounted on the frame and from such sprocket wheels 32 around sprocket wheels indicated at 34 mounted on the lower end of the guides 15. From sprocket wheels 34 the chain 25 extends upwardly and is secured to the lower portion of blocks 20 as indicated at 36.

Extending inwardly from and either formed on or mounted on the blocks 20 are ears or lugs indicated at 40 which, when the lifting carriage is in the position shown in Fig. 8, engages the end 41 of a lever 42 pivoted on a stud indicated at 43 mounted on the frame 10. This lever 42 at its lower end has pivotally mounted thereon as indicated at 44 a link 45 which is pivotally connected at its other end to a clutch operating bar indicated at 46. This clutch operating bar is in the form of a crank, being pivotally mounted on a stud 47 which is mounted upon a cross member 48 of the frame. An arm indicated at 50 forms part of the clutch operating bar and engages at its outer end a clutch member indicated at 51 which is slidably mounted upon a shaft indicated at 52. The clutch member 51 is engageable with a clutch indicated at 53 which has formed thereon a sprocket gear indicated at 54.

The operation of the pivoted lever 42 by engagement with the lugs 40 on the blocks 20 is for moving the clutch member 51 out of engagement with the clutch 53 as hereinafter described, it being understood that the clutch member 51, while being slidably mounted on the shaft 52, is splined or otherwise connected to such shaft so that the member 51 rotates with the shaft.

Means are provided for operating the clutch operating bar 46 to bring such member 51 into engagement with the clutch when the load is placed on the loader. This means comprises what may be termed a pivoted lever indicated at 60 (see Fig. 6), the lower end of which is pivoted at 61 to a portion of the frame indicated at 62. The upper portion of this lever is connected by means of a rod 63 to the clutch operating bar 46 (see Fig. 7). In the form shown the lever 60 comprises a flat metal member mounted in space formed between two load supporting members or boards indicated at 64 which are mounted upon the member 62 of the frame of the loader.

It is pointed out that these two boards or load supporting members 64 are inclined upwardly and rearwardly from the front of the loader as clearly illustrated in Fig. 6 and that the lower portion of the lever 60 is substantially flush with the face of these boards at the lower end of the lever, the upper end of the lever being tilted forwardly of the boards so that when the load is placed upon the lifting carriage and thrown rearwardly against the boards 64 the load first engages the lever 60 and depresses such lever until it is flush with the face of the boards. This rearward movement of the upper portion of the lever moves the rod 63 so that it swings the clutch operating bar in the direction of the arrow (see Fig. 7), thereby moving the clutch member 51 into engagement with the clutch 53. This movement of the clutch operating bar also moves the rod 45 in the same direction and pulls the upper end of the lever 42 into the path of the lugs or ears 40 of the blocks 20 so that when the load reaches the position indicated by dot and dash lines in Fig. 8, the upper end of the lever 42 is engaged and the link or rod 45 moved in the opposite direction, thereby throwing the clutch member 51 out of engagement with the clutch 53.

It is to be understood that the clutch 53 is freely rotatable on the shaft 52. The shaft 52 may be called the clutch shaft and when the clutch member 51 engages the clutch, the clutch is in operative position by reason of the fact that the sprocket wheel 54 thereon is driven by a chain 70 from a sprocket wheel 71 on a power or drive shaft indicated at 72, such drive shaft being driven from any power means mounted on the frame (not shown), as for instance, by an electrical motor or gasoline engine, a transmission indicated at 73 being provided so that the speed of operation may be varied. This drive shaft 72 is also used for driving a conveyor belt indicated at 75. This is done by means of a sprocket chain indicated at 76 driven by a sprocket wheel 77 mounted on the drive shaft 72, the sprocket chain 76 passing over a sprocket 78 mounted on a shaft 79 supported on the uprights 13 of the frame 10. This shaft 79 has mounted thereon a large sprocket wheel indicated at 80 which drives a sprocket chain 81 over a sprocket wheel 82 mounted on a shaft 83 supported upon an extension 84 of the frame generally indicated at 10.

It is to be understood that the drive shaft 72 instead of being driven by power means mounted on the frame of the loader may be driven from the conveyor, that is, from shaft 83 of the conveyor through the medium of the sprocket wheels and shafts just mentioned.

The upper ends of the boards 64 are curved rearwardly as indicated at 86, the sacks or boxes of the load discharging over these curved upper ends to a downwardly inclined table 87 which discharges the sacks or boxes into a transfer chute generally indicated at 89. This transfer chute 89 receives, as for instance, the bags of which the load is made up, from the platform 87. The bags are placed lengthwise on the lifting carriage 18 and are so delivered to the platform 87. The transfer chute is hingedly connected to the platform as indicated at 90 and the lower end of the transfer chute is supported on arms 91 mounted on the frame of the loader and pivotally connected to the chute by a pin or bolt as indicated at 92. The transfer chute 89, as particularly shown in Fig. 3, is provided with a side plate 93 at one side and a deflector plate indicated at 94 on the other side. This deflector plate curves inwardly from one side of the transfer chute as indicated at 95; the bags are delivered to the chute crosswise of the chute traveling in the direction indicated by the arrow in Fig. 3. As these bags enter the chute the deflector plate 94 turns the bags so that they are delivered lengthwise to the belt 75 or other conveyor.

The lower ends of the boards 64 are braced and connected to each other by means of a foot board indicated at 97. It is against this foot board that the lowermost of the stack of bags on the lifting platform is delivered. The upper bags in the stack fall in rearwardly against the pivotal lever 60 until the bags have depressed such lever and rest against the boards 64 as heretofore described.

The lifting carriage 18 is provided with blocks 99 of live rubber which, when the carriage is in loading position, rest upon the floor, thereby absorbing shocks from the loading. As an illustration, a common hand truck indicated at 100 is loaded with a number of sacks indicated at 101, as for instance, containing beans or some other produce. The hand truck is wheeled to the front of the loader until the foot 102 of the truck extends over the lifting platform 18. The truck is then tilted into the dotted line position, throwing the sacks 101 against the lever 60, depressing the same into the dotted line position and, as hereinabove described, the movement of such lever starts the movement of the elevating mechanism, it being understood that the foot of the truck 102 is withdrawn just at the time this movement starts, thereby depositing the bags on the lifting carriage.

The bags, having depressed the lever 60, rest against and slide upwardly on the boards 64 until they are discharged over the top and the carriage engages the lever 42 which stops a hoisting mechanism, as heretofore described.

As particularly shown in Figs. 1 and 2, means are provided for yieldingly returning the carriage to loading position. It has been heretofore pointed out that the chain 25, during a portion of its travel, extends over sprocket 32 on shaft 33. This shaft 33 is also provided with a smaller sprocket indicated at 105 to which is secured as indicated at 106 one end of a sprocket chain 107, the other end of this sprocket chain being attached to a coiled tension spring 108, the lower end of which is attached by means of a link 109 connected to the guides 15 as indicated at 110.

As shown in Fig. 1, the lifting carriage is in loading position, that is, resting upon the floor. As this carriage is moved upwardly the sprocket chain 25 causes the shaft 33 to turn in the direction of the arrow shown in Figs. 1 and 2. This unwinds the end of the sprocket chain from the sprocket 105 until the lifting carriage has reached approximately half-way in its travel to the unloading position and the continued movement of the chain 25 then causes the sprocket chain 107 to wind up on the sprocket wheel 105 as indicated in Fig. 2 so that as soon as the unloading operation is completed the spring 108, through the medium of the chain 107 and sprocket 105, cause reverse rotation of the shaft 33, and through the medium of the shaft 33 give a pull on the chain 25, thus starting downward movement of the lifting carriage, such movement being continued until the carriage reaches the floor due to the weight of the carriage.

That portion of the mechanism consisting of the sprocket chain 25 and its associated sprockets may be denominated the hoisting mechanism; the shaft 52, the drive shaft 72, associated sprockets and sprocket wheels comprise the operating mechanism; and the clutch 53, the levers 60 and 42, with their connections to the clutch operating bar, comprise generally the controlling means.

Although one form of the invention has been particularly shown and described, it is contemplated that various changes and modifications can be made without departing from the scope of the invention and it is intended to cover such changes and modifications as come within the scope of the claims.

We claim as our invention:

1. In a merchandise loader, the combination of: a frame; guides mounted on said frame; a lifting carriage for the load slidably mounted in said guides; hoisting mechanism on said carriage; operating means for said hoisting mechanism; clutch means operatively associated with said hoisting mechanism and said operating means; lever means pivotally mounted on said frame engageable by the load to place the clutch means in operative position; means on the frame engageable by the lifting carriage to place the clutch means in inoperative position; and yieldable means for initiating return movement of the lifting carriage to loading position and for yieldably resisting return movement of said carriage as it approaches the loading position.

2. In a merchandise loader, the combination of: a frame; vertically extending inclined guides on said frame; a lifting carriage for the load slidably mounted in said guides; vertically extending inclined load supporting members at the rear of said guides; said load supporting member being spaced apart to form an opening therebetween; lever means in said opening pivotally connected to said frame at its lower end and extending angularly upwardly into the path of the load; hoisting mechanism connected to said carriage; operating means for said hoisting means; clutch means operatively associated with said hoisting mechanism and said operating means; a clutch controlling member pivotally mounted on said frame; means connecting the clutch controlling member and said lever means; and means connected to said clutch controlling member engageable with the carriage.

3. In a merchandise loader, the combination of: a frame; vertically extending inclined guides on said frame; a lifting carriage for the load slidably mounted in said guides; vertically extending inclined load supporting members at the rear of said guides; said load supporting members being spaced apart to form an opening therebetween; lever means in said opening pivotally connected to said frame at its lower end and extending angularly upwardly into the path of the load; hoisting mechanism connected to said carriage; operating means for said hoisting means; clutch means operatively associated with said hoisting mechanism and said operating means; a clutch controlling bar pivotally mounted on said frame; lever means pivotally mounted at one end to said frame engageable by the load and connected to said clutch controlling bar to move the clutch means into operative position; and means connected to said clutch controlling bar engageable by said lifting carriage to move said clutch into inoperative position.

4. In a merchandise loader, the combination of: a frame; vertically extending inclined guides on said frame; a lifting carriage for the load slidably mounted in said guides; vertically extending inclined load supporting members at the rear of said guides; said load supporting members being spaced apart to form an opening therebetween; lever means in said opening pivotally connected to said frame at its lower end and extending angularly upwardly into the path of the load; hoisting mechanism connected to said carriage; operating means for said hoisting means; clutch means operatively associated with said hoisting mechanism and said operating means; a clutch controlling member pivotally mounted on said frame; means connecting the clutch controlling member and said lever means; means connected to said clutch controlling member engageable with the carriage; said guides comprising U-bars having the open sides of the bars extending inwardly and said lifting carriage comprising a load lifting platform; shoes at the sides of said platform and rollers on said blocks engageable in the open side of said bars.

5. In a merchandise loader, the combination of: a frame; vertically extending rearwardly inclined guides mounted on said frame; a lifting carriage comprising a lifting platform, shoes at the sides of the lifting platform secured thereto, rollers on said shoes engaging said guides; inclined vertically extending load supporting members at the rear of said guides; said load supporting members being laterally spaced apart to form an opening therebetween; a lever means in said opening pivotally connected to said frame at its lower end and extending angularly upwardly into the path of the load; hoisting mechanism connected to said shoes; driving means for the hoisting means; a clutch means connected to said lever means to start the driving means and clutch disengaging means operable by engagement with said carriage.

6. In a merchandise loader, the combination of: a frame; vertically extending rearwardly inclined guides mounted on said frame; a lifting carriage comprising a lifting platform, shoes at the sides of the lifting platform secured thereto, rollers on said shoes engaging said guides; inclined vertically extending load supporting members at the rear of said guides; said load supporting members being laterally spaced apart to form an opening therebetween; a lever means in said opening pivotally connected to said frame at its lower end and extending angularly upwardly into the path of the load; hoisting mechanism connected to said shoes; driving means for the hoisting means; a clutch between said hoisting mechanism and said driving means; a pivoted clutch operating bar mounted on said frame; a connection between said pivoted lever and said bar; a second lever pivotally mounted on said frame adapted to be engaged by the carriage; and connecting means between said second lever and said clutch operating bar.

7. In a merchandise loader, the combination of: a frame; vertically extending rearwardly inclined guides mounted on said frame; a lifting carriage comprising a lifting platform; shoes at the sides of the lifting platform secured thereto; rollers on said shoes engaging said guides; inclined vertically extending load supporting members at the rear of said guides; said load supporting members laterally spaced apart to form an opening therebetween; a lever means in said opening pivotally connected to said frame at its lower end and extending angularly upwardly into the path of the load; hoisting mechanism connected to said shoes; driving means for the hoisting means; a clutch means connected to said lever means to start the driving means; clutch disengaging means operable by engagement with said carriage; a load receiving platform at the upper end of said load supporting members; a transfer chute at the discharge end of said load receiving platform; said load receiving platform and said transfer chute being inclined downwardly from the upper ends of said load supporting members.

8. In a merchandise loader, the combination of: a frame; vertically extending rearwardly inclined guides mounted on said frame; a lifting carriage comprising a lifting platform, shoes at the sides of the lifting platform secured thereto, rollers on said shoes engaging said guides; sprocket chains attached to the upper ends of said shoes and having their lower ends attached to said shoes; sprocket means for driving said chains; a clutch shaft; certain of said sprocket wheels being mounted upon said shaft; means for driving said clutch shaft; inclined vertically extending load supporting members at the rear of said guides; said load supporting members being laterally spaced apart to form an opening therebetween; a lever means in said opening pivotally connected to said frame at its lower end and extending angularly upwardly into the path of the load; a clutch controlling bar pivotally mounted on said frame; connecting means between said lever and said clutch controlling bar; a second lever pivotally mounted on the frame having one end engageable by the shoes on said carriage; and connecting means between said second lever and said clutch controlling bar.

9. A merchandise loader comprising, in combination, a frame including spaced inclined track members, a load supporting carriage, hoist means movable along the track members to raise and lower the carriage, inclined wall means carried by the frame behind the track members and providing side support for the load on the carriage, hoist operating means, a lever associated with the wall means and disposed in position to be actuated by engagement with the load supported by the wall means to start the hoist operating means, a second lever at the top of the frame operable by virtue of engagement with the carriage after the same has been elevated to render the hoist means inoperative, and means for lowering the carriage.

10. In a merchandise loader, the combination of: a frame; guides mounted on said frame; a lifting carriage for the load movable longitudinally of said guides; hoisting mechanism on said carriage; means operable by the load for operatively connecting said hoisting mechanism to said carriage for raising said carriage; means operated by the lifting carriage at a predetermined point in its upward travel for disconnecting said hoisting mechanism from said lifting carriage; and yieldable means for initiating return movement of the lifting carriage to loading position and for yieldably resisting return movement of said carriage as it approaches the loading position.

JOHN W. MITCHELL.
ASA HERREN.